United States Patent Office 3,697,486
Patented Oct. 10, 1972

3,697,486
HIGH MOLECULAR WEIGHT INCREASE OF POLYAMIDES WITH BIS(IMINO-OXAZOLIDINES)
Frank Dobinson, Gulf Breeze, and James H. Saunders, Pensacola, Fla., assignors to Monsanto Company, St. Louis, Mo.
No Drawing. Continuation-in-part of abandoned application Ser. No. 851,425, Aug. 19, 1969. This application Feb. 8, 1971, Ser. No. 113,709
Int. Cl. C08g 20/38
U.S. Cl. 260—78 SC     3 Claims

ABSTRACT OF THE DISCLOSURE

A filament-forming polycarbonamide of inordinately high molecular weight is obtained by incorporating certain bis(imino-oxazolidines) in a suitable polycarbonamide and heating the same. The preferred amount of oxazolidine is about 0.1–1.0% by weight based on the polyamide.

CROSS-REFERENCE TO RELATED APPLICATION

This application is a continuation-in-part of patent application Ser. No. 851,425, filed Aug. 19, 1969, now abandoned.

BACKGROUND OF THE INVENTION

It has long been recognized that higher molecular weight polycarbonamides, commonly known as nylons, have certain desired physical properties which render the same better for certain end uses than correspondingly lower molecular weight polycarbonamides. The latter polymers serve quite well for normal apparel uses and the like. For tire yarn higher molecular weight polymer is indeed desirable where maximum tenacity and greater modulus properties are sought.

Many ways have been suggested for increasing the molecular weight of nylon, among which is the suggestion of simply heating the nylon for an extended period of time. Unfortunately, such exposure of nylon to elevated temperatures results in serious drawbacks such as yellowing of the polymer and degradation of certain other product qualities. Various molecular weight increasing additives have been incorporated in the nylon either before, during or after the polymerization thereof. However, the resulting modified polymer is embrittled; and filaments made therefrom do not function well in end uses where extended flexing thereof occurs. The present invention provides a polyamide of inordinately high molecular weight without severe embrittlement of the polymer.

SUMMARY OF THE INVENTION

A high molecular weight fiber-forming synthetic linear polycarbonamide is prepared by polycondensing the polycarbonamide in the presence of 0.1–1.0 weight percent of a compound of the formula:

R′—N———C=N—R—N=C———N—R′
    |           |                         |      |
    CH₂  O             O  CH₂
      \  /                 \  /
      CH₂                     CH₂

R is an organic divalent radical free from reactive substituents; such as aliphatic radicals including methylene, ethylene, trimethylene, hexamethylene and the like; alicyclic radicals including cyclohexylene, methylene dicyclohexyl

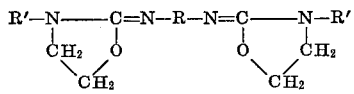

and the like; aromatic radicals including m-phenylene, p-phenylene, 4,4′-biphenylene, 3,3′-biphenylene, methylene diphenyl and the like. These aliphatic, alicyclic or aromatic groups may be substituted with nonreactive groups such as methyl, ethyl, chloro, bromo, etc. R′ is a monovalent organic radical chosen from a lower alkyl of $C_1$–$C_{12}$ atoms, cyclohexyl and phenyl. Such bis(imino-oxazolidines) can be prepared by reacting a 2-imino-oxazoline with a diisocyanate as described in British Pat. No. 1,115,150. It is suggested in this patent that bis(imino-oxazolidines) can be used to stabilize any composition containing ester groups against hydrolysis. However, there is no suggestion of increasing the molecular weight of polycarbonamides by heating the same in a molten state in the presence of these compounds.

The term "polycarbonamide" is intended to include any linear polymer having recurring units of the formula

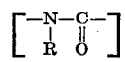

as integral parts of the main polymer chain. R is hydrogen or a monovalent hydrocarbon radical; and the average number of carbon atoms separating the amide groups is at least 2. The polycarbonamide to be fiber-forming has an intrinsic viscosity of at least about 0.4. The polycarbonamide whose molecular weight has been increased in accordance with the present invention will commonly have intrinsic viscosities above about 1.2. Particular polycarbonamides include polyhexamethylene adipamide (nylon-66), polyhexamethylene sebacamide (nylon-610), polymeric 6-aminocaproic acid (nylon-6), the polyamides from bis(4-aminocyclohexyl) methane and azelaic, sebacic or decamethylene-1, 10-dicarboxylic acid. Copolymers, either block or random, are also contemplated.

As known in the polymer art, inherent viscosity is directly related to the molecular weight of the polymer. The inherent viscosity is measured at 25° C. at a concentration of 0.8% by weight of the polymer in a suitable solvent. The preferred solvent is 90% formic acid aqueous solution. To calculate inherent viscosity, the viscosity of the polymer solution is measured relative to that of the solvent alone by measuring the times of flow of equal volumes through the capillary of a standard viscometer and using the following equation:

$$\text{Inherent viscosity} = \log \eta \frac{\text{solution time}}{\text{solvent time}} \Big/ C$$

where C is the concentration expressed in grams of polymer per 100 mls. of solution.

Intrinsic viscosity as employed herein is defined as the limit of the inherent viscosity as the concentration approaches zero. At this low concentration, the inherent viscosity is a good approximation of the intrinsic viscosity.

To obtain the advantage of increasing the molecular weight of the polymer in accordance with the present invention, the polycarbonamide is heated in the presence of a suitable amount of a bis(imino-oxazolidine) of the above formula to a temperature at least sufficient to render the polycarbonamide molten. For nylon-66 a suitable temperature is 280° C. For nylon-6 lower temperatures are satisfactory as long as the polymer is in a molten condition. The maximum temperature is about 300° C. as degradation of the polymer occurs to an undesirable extent when temperatures are much above 300° C.

The time to which the polycarbonamide and the bis-(imino-oxazolidine) compound are heated together in a molten condition is also important. The heating should be continued for at least 5 minutes but no longer than about 2 hours. When heating is continued for less than 5 minutes, no substantial increase in molecular weight of the polymer is realized. Polymer degradation normally occurs when the polymer plus additive are heated for much longer than 2 hours. The increase in molecular weight greatly exceeds that increase normally occurring when one heats polycarbonamide under like conditions without the presence of the additive. There is accomplished with facility in accordance with the present invention an increase at least 20% in intrinsic viscosity over and above the increase in intrinsic viscosity normally occurring by heating polycarbonamide under like conditions in the absence of the bis(imino-oxazolidine) additive.

The following examples illustrate the invention.

EXAMPLE I

Nylon-66 polymer is prepared for use as a standard of comparison with the improved polycarbonamides of the present invention. A solution of 147 parts of hexamethylene diammonium adipate (nylon-66 salt) in 153 parts of water is added to a stainless steel evaporator which had previously been purged of air with nitrogen. The solution is heated to evaporate the water and increase the salt concentration to 75%. This resulting salt solution is charged to a stirred stainless steel autoclave filled with nitrogen. The temperature and pressure in the autoclave are slowly raised to 220° C. and 250 p.s.i.g. Thereafter, the temperature is further increased to 243° C. while the aforesaid pressure is maintained with bleeding off of water vapor. The pressure is gradually reduced to atmospheric over a 25-minute period, and the polymer melt is allowed to equilibrate for 30 minutes at 278° C. The resulting polymer is extruded in the form of a ribbon, quenched and comminuted into particles suitable for remelting and melt-spinning into continuous filaments. The intrinsic viscosity is determined and found to be 0.61.

EXAMPLE II

A portion of the particulate nylon-66 polymer of the preceding example is placed in an air-tight container filled with nitrogen. Thereafter, the polymer is heated at 280° C. for a period of one hour. It is found that the intrinsic viscosity is increased by the heat treatment from 0.61 to 1.18, a viscosity increase over the unheated control of 93%.

EXAMPLE III

A portion of the particulate nylon-66 polymer of the first example is placed in an air-tight container filled with nitrogen. Along with the polymer 0.5 weight percent phenylene bis(imino-N-phenyl oxazolidine) is added. The structural formula of the additive is:

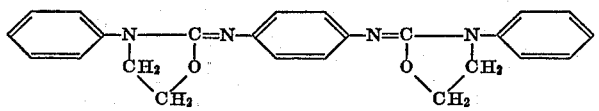

The polymer and additive are heated at 280° C. for a period of one hour. It is found that the intrinsic viscosity is increased by the heat treatment from 0.61 to 1.59, a viscosity increase over the unheated control of 160 percent and a viscosity increase of 35 percent over the heated control. For the same heating period, the increase in intrinsic viscosity by addition of the bis(imino-oxazolidine) as compared to the control having no molecular weight increasing additive is substantial. This means that a higher molecular weight polycarbonamide can be produced by the process of the present invention for a given heat treatment and that increases in molecular weight can be obtained with milder heat treating conditions than it would take to bring the unmodified polymer to the same level of molecular weight as indicated by intrinsic viscosity measurements.

EXAMPLE IV

A portion of the particulate nylon-66 polymer of the first example is placed in an air-tight container filled with nitrogen. Along with the polymer 0.5 weight percent methylene bis(phenylimino-N-phenyl oxazolidine). The structural formula of the additive:

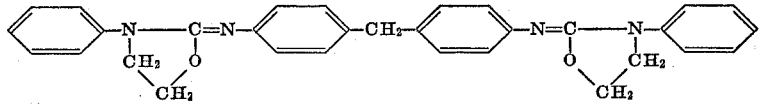

The polymer and additive are heated at 280° C. for a period of one hour. It is found that the intrinsic viscosity is increased by the heat treatment from 0.61 to 1.59, a viscosity increase over the unheated control of 160 percent and a viscosity increase of 35 percent over the heated control.

EXAMPLE V 125 grams of dried particulate nylon-66 polymer are placed in a heated steel autoclave filled with nitrogen gas and equipped with an internal stirring device. The polymer is melted and held at 280° C. for thirty minutes. Immediately thereafter the molten polymer is extruded under pressure through a spinnerette containing 10 orifices. The filaments resulting therefrom have an inherent viscosity of 1.00. The same procedure is repeated except that to the nylon-66 polymer placed in the autoclave 0.5% of phenylene bis(imino-N-phenyl oxazolidine) is added. It is found that filaments produced from the additive-containing polymer have an intrinsic viscosity of 1.24.

From the above, it is readily apparent that the molecular weight of polycarbonamides can be significantly increased by incorporating a bis(imino-oxazolidine) compound therein. The resulting polymer can be used in the many applications where high molecular weight material is desirable. The polymer is attainable without the necessity of greatly altering existing nylon production equipment.

We claim:

1. The process of increasing the molecular weight of a fiber-forming synthetic linear polycarbonamide selected from the group consisting essentially of polyhexamethylene adipamide, polyhexamethylene sebacamide, polymeric 6-aminocaproic acid, and polyamides from bis(4-aminocyclohexyl) methane and a dicarboxylic acid selected from the group consisting essentially of azelaic acid, sebacic acid and decamethylene-1, 10-dicarboxylic acid comprising: heating the said polycarbonamide in the presence of about 0.1–1.0 weight percent of bis(imino-oxazolidine) of the formula

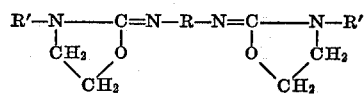

wherein R is an organic divalent radical free from reactive substituents and R' is a monovalent organic radical selected from the group consisting of $C_1$–$C_{12}$ alkyl, cyclohexyl, and phenyl, the heating being carried out from about 5 minutes to about 2 hours while the polycarbonamide is molten but at a temperature of at most 300° C. such that the intrinsic viscosity of the polycarbonamide is at least 20% greater than that normally occurring had no bis(imino-oxazolidine) additive been present under like conditions.

2. The process of increasing the molecular weight of fiber-forming polyhexamethylene adipamide comprising: heating the said adipamide in the presence of about 0.1–1.0 weight percent of phenylene bis(imino-N-phenyl oxazolidine) until the intrinsic viscosity of the said adipamide increases to above about 1.2, the heating being carried out from about 5 minutes to about 2 hours while the polycarbonamide is molten but at a temperature of at most 300° C. such that the intrinsic viscosity of the polycarbonamide is at least 20% greater than that normally occurring had no bis(imino-oxazolidine) additive been present under like conditions.

3. The process of increasing the molecular weight of fiber-forming polyhexamethylene adipamide comprising: heating the said adipamide in the presence of about 0.1–1.0 weight percent of methylene bis(phenylimino-N-phenyl oxazolidine) until the intrinsic viscosity of the said adipamide increases to above about 1.2, the heating being carried out from about 5 minutes to about 2 hours while the polycarbonamide is molten but at a temperature of at most 300° C. such that the intrinsic viscosity of the polycarbonamide is at least 20% greater than that normally occurring had no bis(imino-oxazolidine) additive been present under like conditions.

References Cited

UNITED STATES PATENTS

| 2,557,808 | 6/1951 | Walker | 260—78 |
| 2,993,879 | 7/1961 | Gabler | 260—78 |
| 3,509,107 | 4/1970 | Brignac | 260—78 |

FOREIGN PATENTS

| 1,115,150 | 5/1968 | Great Britain. |

HAROLD D. ANDERSON, Primary Examiner

U.S. Cl. X.R.

260—78 A, 78 L, 857 TW